J. B. BARRETT.
MEANS FOR INDICATING THE POSITION OF SUBMARINE CRAFT.
APPLICATION FILED SEPT. 11, 1916.

1,252,876.

Patented Jan. 8, 1918.
4 SHEETS—SHEET 1.

Witness

Inventor
John B. Barrett
By Church & Church
his Attorneys

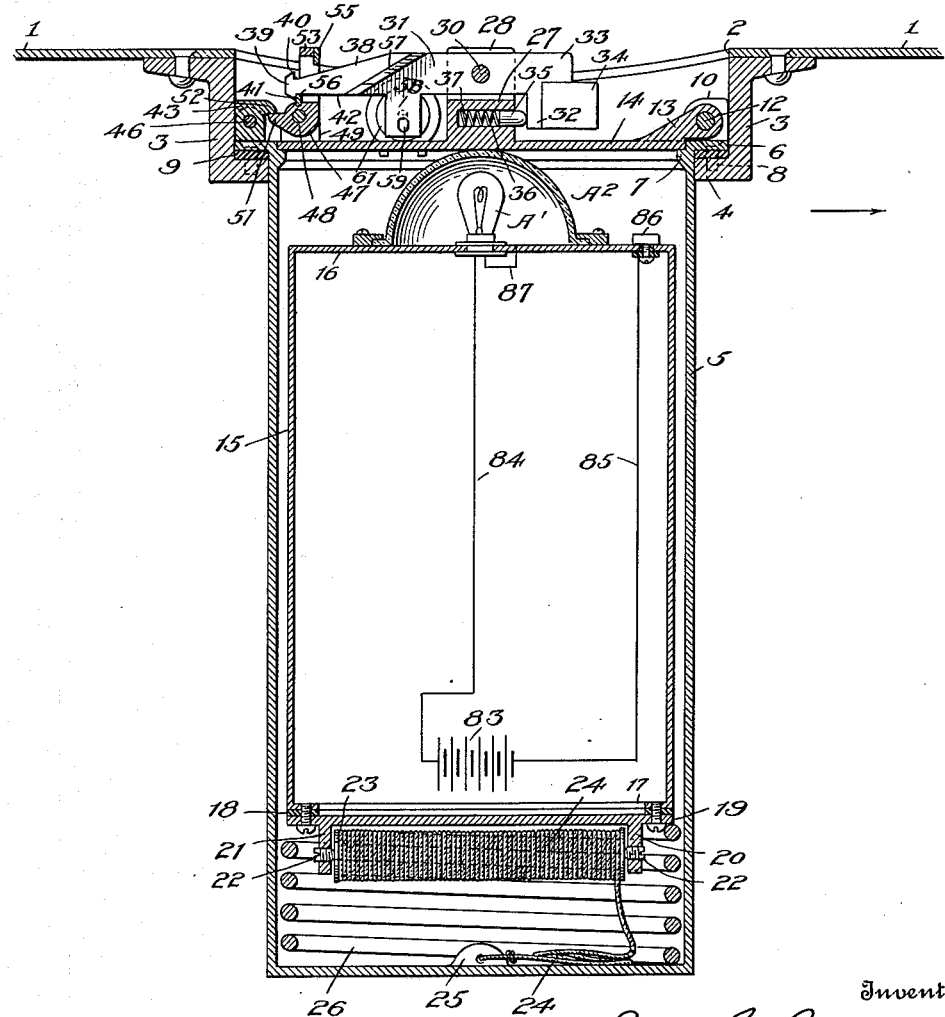

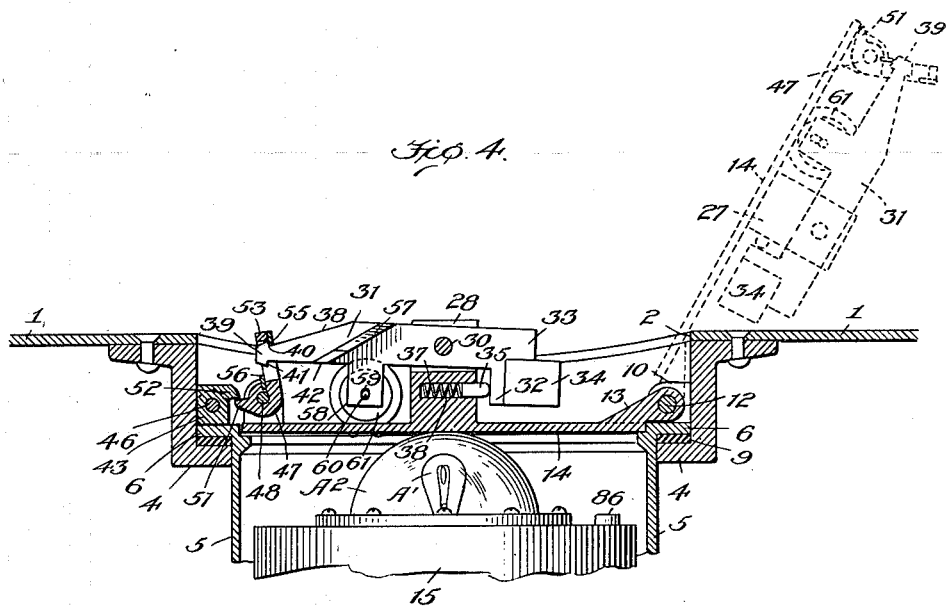

J. B. BARRETT.
MEANS FOR INDICATING THE POSITION OF SUBMARINE CRAFT.
APPLICATION FILED SEPT. 11, 1916.
1,252,876.
Patented Jan. 8, 1918.
4 SHEETS—SHEET 4.
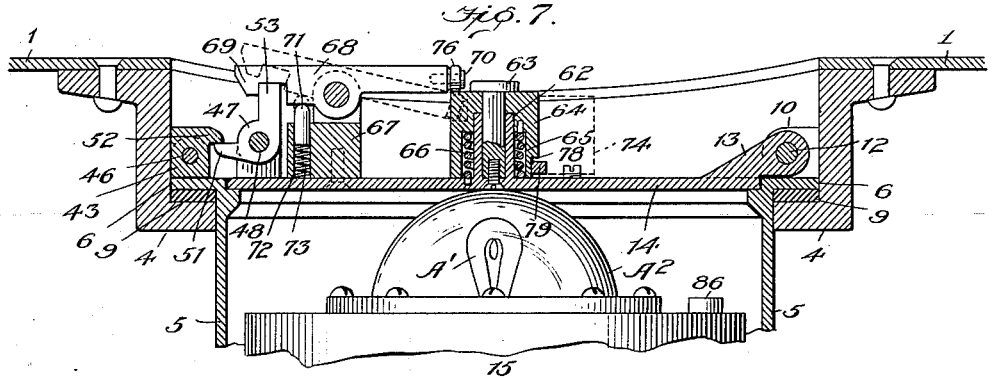
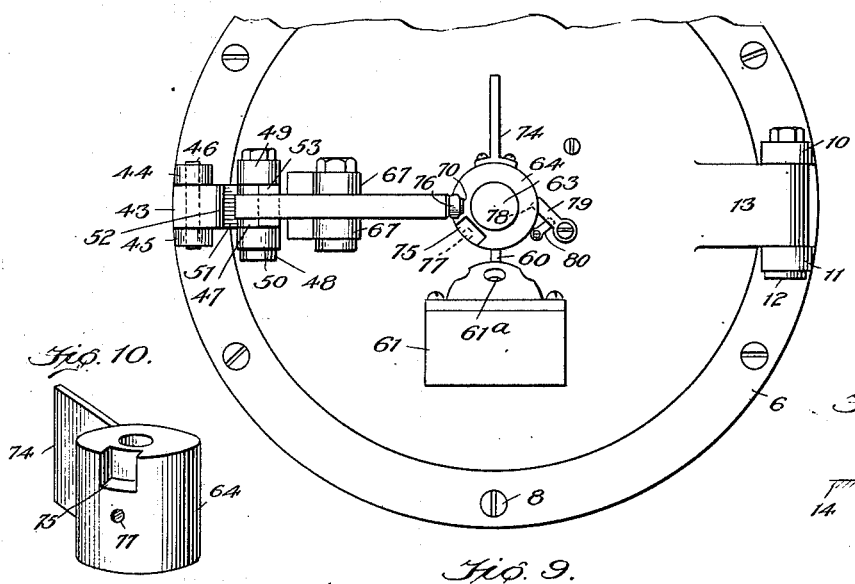
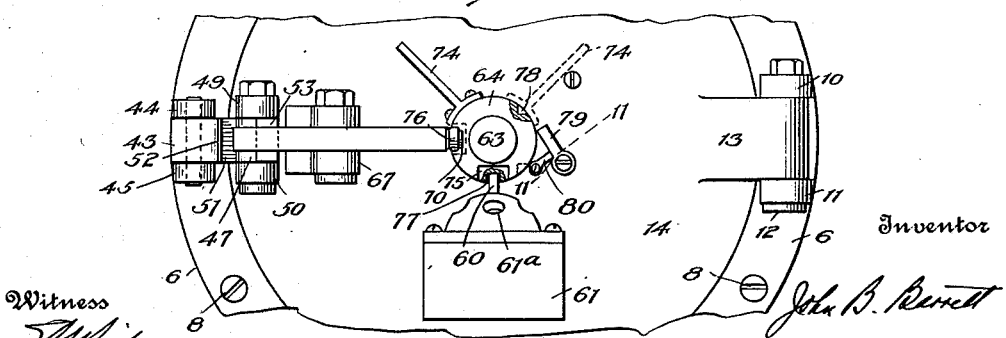
Inventor
John B. Barrett
Witness

UNITED STATES PATENT OFFICE.

JOHN B. BARRETT, OF CLIFTON STATION, VIRGINIA.

MEANS FOR INDICATING THE POSITION OF SUBMARINE CRAFT.

1,252,876.   Specification of Letters Patent.   Patented Jan. 8, 1918.

Application filed September 11, 1916.   Serial No. 119,540.

*To all whom it may concern:*

Be it known that I, JOHN B. BARRETT, a citizen of the United States, residing at Clifton Station, in the county of Fairfax and State of Virginia, have invented certain new and useful Improvements in Means for Indicating the Position of Submarine Craft; and I do hereby declare the following to be a full, clear, and exact description of the same when taken in connection with the accompanying drawings, forming part of this specification.

This invention relates to a novel and efficient means for indicating the final resting place of a self-propelled submarine craft, for example, an automobile torpedo, whereby persons stationed either on shore or on a surface vessel may readily ascertain the position of the vessel and thus, the probability of losing the vessel is greatly reduced.

While it will be understood that the invention is of general utility in submarine craft and the like, a typical application of the invention is in connection with practice automobile torpedoes or dummy torpedoes. These torpedoes are rather intricate in construction and consequently very expensive to manufacture; obviously, a loss of any considerable number of them when firing practice is being carried on will mount up into enormous figures. Unfortunately, as is well known, the action of such torpedoes after launching is extremely uncertain. Sometimes, the motive power fails before the torpedo has run its course, which may cause it to sink or rise and float on the surface of the water, or the torpedo may either rise or sink abruptly at the end of its course, as soon as the normal motive or propelling power of the vessel is spent. These unforseen conditions which frequently arise, render the recovery of practice torpedoes exceedingly difficult; in some instances, several days have been spent in hunting for a single stray torpedo. Prior to my invention several arrangements have been proposed for locating stray or sunken torpedoes. Among these probably the most practical arrangement now in use is a device for releasing, after the torpedo is launched, a quantity of oil from a reservoir contained within the body of the torpedo. The theory of this arrangement is that the oil, being of less specific gravity than the water, will rise to the surface and indicate the course and final resting place of the launched vessel. There is, however, a very serious disadvantage attendant the use of oil as a means for indicating the course or final resting place of a practice torpedo, and that is, in harbors and other places close to shore, where practice torpedo firing almost invariably takes place, the water is generally crowded with a large number of motor boats, tank steamers, and other vessels which are constantly flooding the surface of the water with bodies of oil. This results in a confusion wherein it is almost impossible to locate the particular body of oil indicating the presence of a torpedo.

The primary object of the present invention is to provide an indicating means for showing the final resting position of a vessel of the type above specified, which may be seen for a considerable distance over the water, and readily distinguished from other objects, in connection with an efficient and reliable mechanism for effecting the release of the indicating means at the proper time.

For a full understanding of the invention reference is made to the ensuing detail description, when taken in connection with the accompanying drawings which illustrate a structural embodiment of the invention in a preferred form. The novel features of the invention will be particularly pointed out and specified in the claims at the end of the specification.

In the drawings:

Fig. 3 is a vertical sectional elevation through the chamber and skin of the torpedo head, showing in their normal position the parts of the mechanism for locking the chamber cover closed.

Fig. 4 is a view of the upper portion of the chamber, similar to Fig. 3, but showing in full lines the position of the parts after the torpedo has been launched and is running its course, and in dotted lines the position of the parts when the cover is open to permit release of the indicator.

Fig. 5 is an enlarged perspective view of one of the members of the locking mechanism.

Fig. 6 is an enlarged perspective view of another member of the locking mechanism.

Fig. 7 is a vertical sectional elevation through the upper portion of the chamber, illustrating a modified form of locking mechanism for the cover.

Fig. 8 is a top plan view of the same showing the parts in normal position.

Fig. 9 is a view similar to Fig. 8, but showing in full lines the parts in the position they assume when the torpedo has been launched and is still running its course, and showing in dotted lines the parts in cover releasing position.

Fig. 10 is a detail perspective view of the lock controlling member employed in the form illustrated in Figs. 7 to 9 inclusive.

Fig. 11 is a detail view of a spring catch, hereinafter more fully explained.

Figure 1:
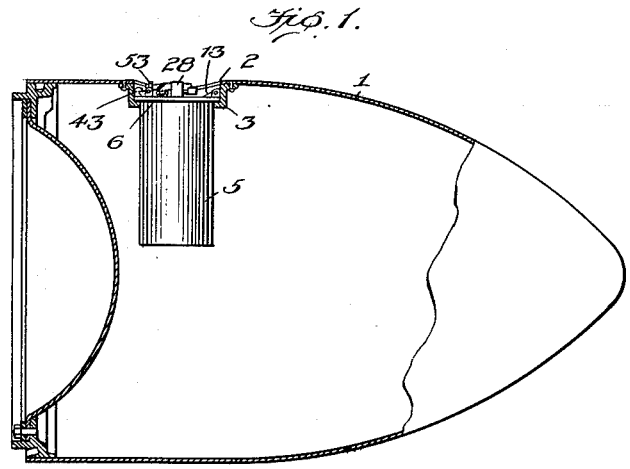
Figure 1 is a vertical sectional elevation of the head of a torpedo of the usual variety, provided with the novel indicating means constructed in accordance with the present improvements.

In the forms illustrated in all the figures, the head of a practice torpedo is indicated by the hull or skin 1 usually constructed of metal and sealed against the entrance of water at all times. The rearward or aft portion of the torpedo will be of any preferred construction provided with means for propelling the vessel through the water. As the construction of the torpedo itself and the propelling means forms no part of the present invention, it is not deemed necessary to illustrate the same herein. The upper side of the hull or skin 1 is cut away to provide a circular opening 2, beneath which is rigidly secured to the inner face of the skin directly surrounding the opening, a ring 3, having an inwardly and laterally projecting annular flange 4. This flange 4 forms a preferred form of support or seat for a tubular chamber or well 5 having its bottom end closed and provided at its upper open end with a laterally and outwardly projecting annular flange 6, adapted to engage the flange 4, when the chamber is seated within the torpedo head, as shown more particularly in Fig. 3. The chamber or well 5 is further provided with an inwardly and laterally extending annular flange 7 located adjacent the upper end of said chamber, and for a purpose which will presently appear. As stated the flange 6 is designed to seat on the flange 4 of the ring 3, and the two flanges are securely fastened together by means of rivets or bolts 8. In order to prevent water from entering the head at the point where the flanges 4, 6, are connected together, a rubber ring or other suitable washer 9 is interposed between the flanges, as shown in Fig. 3.

Figure 2:
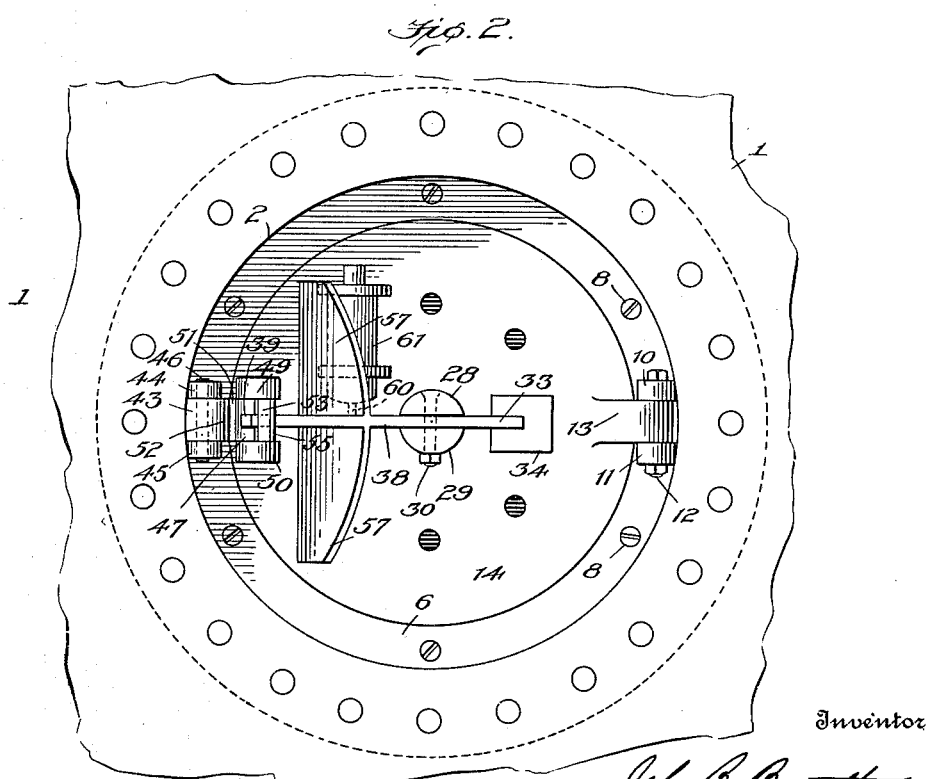
Fig. 2 is an enlarged top plan view of a portion of the torpedo head over the chamber or well containing the indicator.

Mounted on or formed integrally with the flange 6 of the chamber are spaced-apart uprights 10, 11, (Fig. 2) which mutually support a pintle 12 (Fig. 2). On the pintle 12 is pivoted the hinge 13 of a cover 14. The latter preferably consists of a circular metallic plate; and when closed is adapted to seat on the inwardly projecting flange 7 at the upper end of the chamber. Normally, it is intended that the cover 14, close the upper end of chamber 5 and for this purpose suitable locking mechanism is provided, of which two embodiments are illustrated herein, as will be presently set forth.

The chamber 5 is intended for the purpose of receiving and confining the indicator, which, in accordance with the present embodiment of the invention, is a buoyant attachment normally carried by the vessel, and is released when the motive power of the vessel is spent and the vessel submerges a predetermined depth beneath the surface of the water. In its preferred embodiment, the indicator consists of a hollow cylindrical member 15, having its upper end 16 closed, as shown particularly in Fig. 3. At its lower end the cylinder 15 is provided with an inwardly projecting flange 17, the latter forming a seat against which a washer 18 is clamped by means of the bottom closure plate 19. Thus constructed, the member 15 is substantially watertight, and being hollow and of less specific gravity than the water which it displaces, the cylinder will rise to the surface of the water and float thereon, when released from its confined position within the chamber 5.

The bottom closure plate 19 is formed with depending spaced brackets 20, 21, which are respectively provided with screw-studs 22 set in alinement with each other. These studs furnish supports for the opposite ends of a reel 23 on which is wound and secured a rope 24. The free end of said rope may be looped within an eye in and secured to a stud 25 resting on the bottom of the chamber 5, whereby the cylinder 15 will remain attached to the vessel, after the cylinder is released and it rises to the surface of the water. Release of the cylinder will of course effect unwinding of the rope 24 and the latter will be long enough to permit the cylinder to reach the surface of the water.

Within the chamber 5 and beneath the cylinder 15, is a spring 26, adapted to engage the closure plate 19 of the cylinder, and held under tension by the pressure of the cylinder, when the latter is confined within the chamber and the top cover 14 is closed. The spring 26 forms a preferred means for ejecting the cylinder 15 from its confining chamber when locking mechanism for retaining the cover 14 closed is released, thereby freeing the cylinder 15 from the hull of the vessel, whereupon said cylinder will rise to the surface of the water, if the vessel be submerged.

According to the present invention cover locking mechanism is provided which is adapted to release the cover 14 permitting the same to be opened by the pressure of the spring 26, when the vessel submerges to a predetermined depth beneath the surface of the water, and which will retain the cover 14 closed, while the vessel is running its course, or until the motive power of the vessel is spent. Thus, two conditions are necessary for the release of the indicating cylinder 15, *i. e.*, the vessel must have run its course, and must have submerged to a predetermined depth. Otherwise the cover 14 will be retained closed and escape of the indicating cylinder is prevented. Locking mechanism having the above set forth properties may of course be embodied in many different forms, two of which are illustrated herein, and will now be described.

Referring first to the form of locking mechanism illustrated in Figs. 1 to 6 inclusive, it will be seen that the cover plate 14 is provided, preferably at its center, with a head 27, on which is mounted two spaced uprights 28, 29, respectively. Pivoted by a pin 30 passing through said uprights is what might be termed the "lock-actuating member." The latter consists of a horizontal arm 31 pivoted between its forward and rear ends on the pin 30. Near its rear end, the arm 31 is formed with a dependent finger 32 against which and the horizontally projecting rear extremity 33 is secured a suitable weight 34, which tends to move the forward end of the arm upwardly as clearly illustrated in Fig. 4. The finger 32 behind the weight is adapted to rest against a buffer formed by a stud 35 projecting into a lateral slot 36 in the head 27, said stud 35 being pressed outwardly of the slot 36 by a spring 37. The forward end of the arm 31 is downwardly beveled, as indicated by the reference character 38, and at the forward extremity the arm is provided with a head 39, having forwardly and downwardly beveled upper and lower edges and vertical edges 40, 41, which respectively meet the downwardly beveled edge 38 and the lower horizontal edge 42 of the main body portion of the arm. This construction provides an upper and a lower hook or catch at the forward extremity of the arm, which are respectively adapted to function in the manner to be set forth particularly hereinafter.

Positioned forwardly of the actuating or controlling arm 31 are two coöperating locking members, adapted, when held in locking position by the arm 31 to retain the cover 14 firmly on its seat 7. When the said two members are in released position the spring 26 pressing on the buoyant cylinder 15 will cause the latter to lift the cover 14 to a position approximately coincident with that indicated by dotted lines in Fig. 4, and concurrently eject the cylinder 15 from its confining chamber.

The fixed locking member or catch 43 is positioned on the flange 6 at the upper end of the chamber 5, and secured thereto preferably in such manner that it will release itself from its position when the vessel has remained for an extended period of time, *i. e.*, any known period of time greater than the normal running time of the vessel. This is quite an important feature of advantage, although not an absolute essential to the present invention, and the advantage lies in the fact that, whether the vessel is running or still in the water, and whether it has sunk to a predetermined submerged depth, or not, the locking member 43 will release, permitting the cover 14 to open and the cylinder 15 to escape. For this purpose, the locking member 43 may be secured between fixed uprights 44, 45, mounted on the flange 6 by a pin 46, constructed of some material, such as a slowly soluble chemical, for example, which will dissolve in salt water in a known time. The pin 46 may, of course, be made of any substance which will dissolve in salt water in a period of time greater than the normal running time of the vessel, the latter being usually only a few minutes, and which will be secure enough to hold the fixed locking member in place while the vessel is running its normal course.

The other locking member 47 (see Fig. 6) is pivotally mounted by a pin 48 between fixed uprights 49, 50 on the cover 14. Said member 47 is in the form of a bell crank having a forwardly and horizontally projecting locking portion 51 adapted, when in locking position to engage the undercut locking edge 52 of the fixed locking member 43. The vertical portion 53 of the movable locking member 47 is formed with a rectangular opening 54 adapted to receive the head 39 at the forward end of the actuating arm 31. Secured to the upper rear face and the lower front face of the vertical portion of said locking member are plates 55, 56, respectively, the edges of which are adapted to be engaged by the upper and lower hooks formed on the head 39.

Mounted on the actuating arm 31 and projecting laterally therefrom are wings or blades 57, preferably set at an angle to the horizontal as shown more particularly in Figs. 4 and 5. In practice the angular disposition of said wings 57 will be such that the water will sweep down and underneath the wings so as to elevate the forward end of the actuating arm 31. Depending from the forward end of said arm 31 is a projection 58 having a slot 59, the latter receiving a piston 60 of a hydrostatic device 61. The hydrostatic device may be of any preferred well known type adapted to withdraw the piston 60 from the slot 59 when the piston 60 is under a predetermined hydrostatic pressure of submergence. When the pressure of submergence is less than the maximum pressure, the latter, of course, being determined by practice, the piston 60 will be advanced into the slot 59.

The operation of the above described locking mechanism is as follows: Before the torpedo is launched the arm 31 will be manually adjusted so that it assumes the position indicated in Fig. 3, i. e., with the lower hook of said arm engaging the lower edge 56 of the movable locking member. When the parts are in this position the locking portions of the two locking members 43, 47, are in engagement and the cover 14 is retained in closed position. As soon, however, as the torpedo is launched and its motor is set in motion the flow of the water underneath the wings 57 will lift the forward end of the arm 31 and move it to the position illustrated in Fig. 4, wherein the upper catch or hook of the arm engages the locking edge 55. This movement of the forward end of arm 31 is of course, assisted to some extent by the counter weight 34 mounted at the rear end of said arm, the weight constantly tending to lift the forward end of the arm. On the other hand, the movement caused by the weight is resisted by the spring - pressed buffer 35, which prevents the weight from suddenly pulling the rear dependent end of arm 31 into engagement with the central head 27 on the cover, when catch 41 is released from catch 56. Thus there is no danger of jarring the cover loose by a too-quick movement of the rear end of arm 31. In fact the spring 37 and the weight 34 approximately balance each other, so that without the pressure of the water on the wings 57 or the locking action of the hydrostatic piston head 39 would be maintained in a neutral position intermediate the upper catch 55 and the lower catch 56 of member 47. At the same time the movement of the arm shifts the slot 49 into such position that the hydrostatic piston 60 will enter the slot. Thus so long as the vessel is running under its motive power the two members 43, 37 of the locking mechanism will be retained in locked engagement by the pressure of the water on the wings 57. As the piston 60 is in the slot 59 releasing movement of the arm 31 cannot be effected until said piston is withdrawn. If the vessel submerges to a depth beneath the surface of the water sufficient to cause the hydrostatic pressure of submergence to withdraw the piston 60 from the slot a releasing movement of the arm 31 may be effected provided the vessel is not running under its motive power. In this manner the indicating cylinder 15 is retained in the confining chamber 5 unless two conditions are present, the vessel must have completed its normal running course or be stationary in the water, and must have submerged to the proper depth. Without the presence of both of these conditions, the indicating cylinder 15 will not be released.

Another mode of carrying my invention into effect is illustrated in Figs. 7 to 11 inclusive. As shown, the cover 14 is provided with a cylindrical stud 62 receiving a headed pin 63. Journaled beneath the head of the pin and surrounding the stud is a cylinder 64 having an interior chamber 65 within which is located a coil spring 66. One end of the coil spring is secured to the cylinder 64 and the other end of the spring is secured to the cover 14. The tension of the spring is in a direction to rotate the cylinder 65 toward the right of Fig. 8. Pivoted to a bracket member 67 supported on the cover 14 is an arm 68 having a hook 69 at its forward end adapted to engage the upper edge of the movable locking member 47 and retain the latter in locking position as illustrated in full lines in Fig. 7. The rear end of the arm 68 is preferably provided with a weight which may take the form of a pin 70 and roller 76 which tends to release the hook 69 from engagement with the movable locking member 47 by lifting the forward end of said arm 68. This lifting movement may be assisted by means of a stud 71 slidably mounted in a vertical slot 72 in the bracket member 67 and bearing on the lower edge of the forward portion of the arm 68. A spring 73 advances the stud 71 from its slot.

Projecting from the side of the cylinder 64 is a water wing 74 and formed in the upper portion of said cylinder is a recess 75 of sufficient depth to permit a sufficient lowering movement of the rear end of the arm 68 to effect release, when the recess 75 is positioned in registry behind the rear end of said arm. Normally the arm is retained in elevated position by engagement of the roller 76 with the upper horizontal face of the cylinder 64. In the side of the cylinder 64 just beneath the recess 75 is a slot 77 adapted to receive the piston 60 of a hydrostatic device 61. Water may enter the hydrostatic device to retract the piston 60 through holes 61$^a$ in the cylinder of the hydrostatic device. A notch 78 is cut in the side of the cylinder 64 and is adapted to receive the end of a pivoted locking finger 79 which is pressed into said notch, when the latter is in registry, by a spring 80.

In operation the above described modification is similar to the form of the invention illustrated in Figs. 1 to 6 inclusive. Before the torpedo is launched, the cylinder 64 is moved to the position illustrated in Fig. 8 wherein the notch 78 receives the pivoted arm 79 and the roller 76 at the rear end of the arm 68 rests on upper face of the cylinder 64, thereby retaining the hook 69 in engagement with the movable locking member 47 so as to hold the latter in locked engagement with its coöperating fixed locking member 43. When the torpedo is launched and is running under its motive power the pressure of the water flow against the wings 74 will move the latter to the position illustrated in full lines in Fig. 9. In this position the slot 77 is in registry with and receives the piston 60 of the hydrostatic device, and the spring 66 has been placed under tension. So long as the torpedo is running under its motive power, no matter what the depth of submergence of the vessel is, locking engagement of the two members 43, 47, will be maintained, because the pressure of the water flow on the wing 74 will throw the recess 75 out of registry with the rear end of the arm 68. When the normal running course of the vessel is completed, or the vessel is stationary, the spring 66 will be free to rotate the cylinder 64 provided the vessel has submerged sufficiently to effect a retracting movement of the hydrostatic piston 60. When the piston 60 is retracted the rotary movement of the cylinder 64 imparted by the spring 66 will position the cylinder to effect registry of the recess 75 with the rear end of the arm 68 permitting the latter to drop and release the movable locking member 47. The cylinder is indicated in releasing position by the dotted lines in Fig. 9.

If desired the indicating cylinder 15 may be provided with an electric light A' mounted in the top of said cylinder and protected by a glass globe $A^2$. The current will be supplied by a battery 83 having the line wires 84 and 85. Line wire 84 extends to the lamp and line wire 85 to a terminal 86. The circuit is completed through the top of the cylinder 15 and a terminal wire 87. The use of a lamp is desirable for indicating the position of a submerged torpedo at night or in foggy weather.

Obviously many changes may be made in the particular embodiments of the invention illustrated without departing from the spirit of the invention. For example, the cylinder 15 may be utilized to lift a submerged vessel by attaching a suitable chain to the cord carried by the cylinder.

What is claimed is:—

1. In combination with a self propelled vessel of the class described, a releasable buoyant attachment normally carried by the vessel, and adapted, when released from the vessel, to indicate a submerged position of the latter, locking means for retaining the buoyant attachment on the vessel releasable when the vessel submerges to a predetermined depth beneath the surface of the water, and a second locking means for said buoyant attachment releasable when the motive power of the vessel is spent.

2. In combination with a self-propelled vessel, of the class described, an indicating buoy normally carried by the vessel, locking means for retaining the buoyant attachment on the vessel releasable when the vessel submerges to a predetermined depth beneath the surface of the water, and a second locking means for said buoyant attachment maintained in locking relation by pressure of the water flow, while the vessel is running its normal course under its motive power, and releasable when the motive power of the vessel is spent.

3. In combination with a self-propelled vessel of the class described, an indicating buoy normally carried by the vessel, locking means for retaining the buoyant attachment on the vessel releasable by a predetermined hydrostatic pressure of submergence, and a second locking means for said buoyant attachment maintained in locking relation by pressure of the water flow, while the vessel is running its normal course under its motive power, and releasable when the motive power of the vessel is spent.

4. In combination with a self-propelled vessel of the class described, an indicating buoy normally carried by the vessel, locking means for retaining the buoyant attachment on the vessel releasable by a predetermined hydrostatic pressure of submergence, and a second locking means independent of the first named locking means for said buoyant attachment adapted to be maintained in locking relation by pressure of the water flow while the vessel is running its normal course under its motive power, and releasable when the motive power of the vessel is spent.

5. In combination with a self-propelled torpedo, a releasable buoyant attachment normally carried by the torpedo, and adapted, when released from the torpedo, to indicate a submerged position of the latter, means for releasing the buoyant attachment when the torpedo submerges, to a predetermined depth beneath the surface of the water, means for preventing such release until the motive power of the torpedo is spent, and additional releasing means for said buoyant attachment operable when the torpedo remains in the water for a period of time greater than the normal running time of the torpedo.

6. In combination with a self-propelled torpedo, a releasable buoyant attachment normally carried by the torpedo, and adapted, when released from the torpedo, to indicate a submerged position of the latter, means operable by a predetermined hydrostatic pressure of submergence when the motive power of the torpedo is spent for releasing said buoyant attachment, and additional releasing means for said buoyant attachment operable when the torpedo remains in the water for a period of time greater than the normal running time of the torpedo.

7. In combination with a self-propelled torpedo, a releasable indicating means normally carried by the torpedo, means operable by a predetermined hydrostatic pressure of submergence for releasing said indicating means, means for preventing such release until the motive power of the vessel is spent, and additional releasing means for said indicating means operable when the torpedo remains in the water for a period of time greater than the normal running time of the torpedo.

8. In combination with a self-propelled vessel of the class described, a releasable indicating buoy normally carried by the vessel, a spring released mechanism for locking the buoy to the vessel adapted to be retained in locking position by the water flow while the vessel is running its course and means releasable by a predetermined hydrostatic pressure of submergence for retaining said locking mechanism in locking position.

9. In combination with a self-propelled vessel of the class described, a releasable indicating buoy normally carried by the vessel, a spring-released mechanism for locking the buoy to the vessel adapted to be retained in locking position by the water flow while the vessel is running its course, and a hydrostatic piston adapted to engage said locking mechanism and retain the latter in locking position until the vessel submerges to a predetermined depth beneath the surface of the water.

10. In combination with a self-propelled vessel of the class described, a releasable indicating buoy normally carried by the vessel, and means for locking the buoy to the vessel adapted to be retained in locking position by impact of the water flow while the vessel is running its course.

11. In combination with a self-propelled vessel of the class described, a releasable indicating buoy normally carried by the vessel, and means for retaining the buoy on the vessel, said means having a surface against which the water flow, while the vessel is running, impacts to maintain the retaining means in buoy-locking position.

12. In combination with a self-propelled vessel of the class described, a releasable indicating buoy normally carried by the vessel, locking mechanism for retaining the buoy on the vessel, and means operated directly by the impact of the water flow while the vessel is running for retaining said locking mechanism in buoy-locking position.

13. In combination with a self-propelled vessel of the class described, a releasable indicating buoy normally carried by the vessel, mechanism for locking the buoy to the vessel, means operated directly by the impact of the water flow while the vessel is running for retaining said locking mechanism in buoy-locking position, and means releasable by a predetermined hydrostatic pressure of submergence for retaining said locking mechanism in buoy-locking position.

14. In combination with a self-propelled vessel of the class described, a releasable indicating buoy normally carried by the vessel, mechanism for locking said buoy to the vessel, and a wing carried by said mechanism and positioned to receive the impact of the water flow, while the vessel is running and thereby retain said locking mechanism in buoy-locking position.

15. In combination with a self-propelled vessel of the class described, a releasable indicating buoy normally carried by the vessel, mechanism for locking said buoy to the vessel, means operated directly by the impact of the water flow, while the vessel is running, for retaining said locking mechanism in buoy-locking position, means releasable by a predetermined hydrostatic pressure of submergence for retaining said locking mechanism in buoy-locking position, and a spring for ejecting the buoy from the vessel when released.

16. In combination with a self-propelled vessel, of the class described, a releasable indicating buoy normally carried by the vessel, mechanism including a plurality of coöperating locking members for locking said buoy to the vessel, a water-soluble pin for retaining one of the members of the locking mechanism on the vessel whereby the locking mechanism is releaased when the vessel remains for an extended period of time in the water, means operated directly by the impact of the water flow while the vessel is running for retaining said locking mechanism in locking position, and means releasable by a predetermined hydrostatic pressure of submergence for retaining said locking mechanism in locking position.

17. In combination with a self-propelled vessel of the class described, a releasable indicating buoy normally carried by the vessel, mechanism for locking the buoy to the vessel, comprising a pair of coöperating members, a lock actuating member adapted to have a normal lock retaining position and a second automatically releasable lock retaining position, means carried by the locking member for moving the latter to said second named position and retaining it therein while the vessel is running its normal course under its motive power, means tending to release said actuating member while in said second named position, and means operable by a predetermined hydrostatic pressure of submergence for retaining the actuating member in said second named position.

JOHN B. BARRETT.